(12) United States Patent
Yu et al.

(10) Patent No.: US 11,910,358 B2
(45) Date of Patent: Feb. 20, 2024

(54) PHYSICAL SIDELINK CONTROL CHANNEL TRANSMISSION FOR SIDELINK INTER-USER EQUIPMENT RESOURCE ALLOCATION

(71) Applicant: Nokia Technologies Oy, Espoo (FI)

(72) Inventors: Ling Yu, Kauniainen (FI); Vinh Van Phan, Oulu (FI); Lianghai Ji, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 92 days.

(21) Appl. No.: 17/395,377

(22) Filed: Aug. 5, 2021

(65) Prior Publication Data
US 2022/0046595 A1    Feb. 10, 2022

Related U.S. Application Data

(60) Provisional application No. 63/062,732, filed on Aug. 7, 2020.

(51) Int. Cl.
| | | |
|---|---|---|
| *H04W 72/04* | (2023.01) | |
| *H04W 72/12* | (2023.01) | |
| *H04W 72/02* | (2009.01) | |
| *H04W 80/02* | (2009.01) | |
| *H04W 72/20* | (2023.01) | |
| *H04W 72/56* | (2023.01) | |
| *H04B 7/185* | (2006.01) | |

(52) U.S. Cl.
CPC ........ *H04W 72/02* (2013.01); *H04B 7/18513* (2013.01); *H04W 72/20* (2023.01); *H04W 72/56* (2023.01); *H04W 80/02* (2013.01)

(58) Field of Classification Search
None
See application file for complete search history.

(56) References Cited

U.S. PATENT DOCUMENTS

| 11,245,456 B2 * | 2/2022 | Marinier | H04B 7/0404 |
| 2017/0054540 A1 * | 2/2017 | Kim | H04L 5/0033 |
| 2018/0324848 A1 * | 11/2018 | Baghel | H04W 72/23 |

(Continued)

FOREIGN PATENT DOCUMENTS

WO    2020/033704 A1    2/2020

OTHER PUBLICATIONS

Extended European Search Report received for corresponding European Patent Application No. 21188101.6, dated Dec. 22, 2021, 15 pages.

(Continued)

*Primary Examiner* — Sai Aung
(74) *Attorney, Agent, or Firm* — SQUIRE PATTON BOGGS (US) LLP

(57) ABSTRACT

Systems, methods, apparatuses, and computer program products for physical sidelink transmission for sidelink inter-user equipment resource allocation. A method may include receiving at a first user equipment based on a decision of a second user equipment, a resource allocation from the second user equipment. The method may also include determining whether to transmit a sidelink control information associated to a transmission using the resource allocation over a control channel. The method may further include performing a transmission using the resource allocation.

19 Claims, 6 Drawing Sheets

(56) References Cited

U.S. PATENT DOCUMENTS

| | | | | |
|---|---|---|---|---|
| 2019/0020987 A1* | 1/2019 | Khoryaev | | H04W 72/12 |
| 2019/0103947 A1* | 4/2019 | Park | | H04L 1/1861 |
| 2020/0008030 A1* | 1/2020 | Kim | | H04W 4/70 |
| 2020/0252838 A1* | 8/2020 | Akdeniz | | H04W 36/0009 |
| 2020/0252871 A1* | 8/2020 | Chae | | H04W 52/0274 |
| 2020/0313825 A1* | 10/2020 | Ryu | | H04L 5/0051 |
| 2021/0212023 A1* | 7/2021 | Zeng | | H04W 72/121 |
| 2021/0266868 A1* | 8/2021 | Shin | | H04L 1/0061 |
| 2021/0306828 A1* | 9/2021 | Panteleev | | H04W 72/0446 |
| 2022/0039080 A1* | 2/2022 | Khoryaev | | H04W 4/40 |

OTHER PUBLICATIONS

"On 2-stage PSCCH design", 3GPP TSG-RAN WG1 Meeting #95, R1-1813648, Agenda: 7.2.4.1.5, Ericsson, Nov. 12-16, 2018, 4 pages.

"Summary for NR-V2X AI—7.2.4.1.4 Resource Allocation Mechanism", 3GPP TSG RAN WG1 Meeting #95, R1-1814260, Agenda: 7.2.4.1.4, Intel Corporation, Nov. 12-16, 2018, pp. 1-14.

"Summary of email discussion on Rel-17 sidelink enhancement", 3GPP TSG RAN #86, RP-192745, Agenda: 9.1.1, LG Electronics, Dec. 9-12, 2019, 27 pages.

"Inter-UE coordination in sidelink resource allocation mode 2", 3GPP TSG RAN WG1#104-e, R1-2100539, Agenda: 3.11.1.2, Nokia, Jan. 25-Feb. 5, 2021, 8 pages.

"Inter-UE coordination in mode 2 sidelink resource allocation", 3GPP TSG RAN WG1 #105-e, R1-2104177, Agenda: 3.11.1.2, Nokia, May 10-27, 2021, 20 pages.

"3rd Generation Partnership Project; Technical Specification Group Radio Access Network; Study on evaluation methodology of new Vehicle-to-Everything (V2X) use cases for LTE and NR; (Release 15)", 3GPP TR 37.885, V15.3.0, Jun. 2019, pp. 1-38.

"New WID on NR sidelink Enhancement", 3GPP TSG RAN Meeting #86, RP-193231, Agenda: 9.1.1, LG Electronics, Dec. 9-12, 2019, 6 pages.

"3rd Generation Partnership Project; Technical Specification Group Radio Access Network; NR; Study on NR Vehicle-to-Everything (V2X) (Release 16)", 3GPP TR 38.885, V16.0.0, Mar. 2019, pp. 1-122.

European Office Action issued in corresponding European Patent Application No. 21 188 101.6-1216 dated Aug. 29, 2023.

* cited by examiner

PHYSICAL SIDELINK CONTROL CHANNEL TRANSMISSION FOR SIDELINK INTER-USER EQUIPMENT RESOURCE ALLOCATION

RELATED APPLICATIONS

The present application claims priority from U.S. Provisional Patent Application No. 63/062,732, filed on Aug. 7, 2020, which is hereby incorporated in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for physical sidelink transmission for sidelink inter-user equipment resource allocation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Various aspects of examples of the invention are set out in the claims.

According to a first aspect of the present invention, there is disclosed an apparatus caused to receive at a first user equipment based on a decision of a second user equipment, a resource allocation from the second user equipment; caused to determine whether to transmit a sidelink control information associated to a transmission using the resource allocation over a control channel; and caused to perform the transmission of the sidelink control information over the control channel using the resource allocation.

According to a second aspect of the present invention, there is disclosed an apparatus caused to allocate resources from a second user equipment to a first user equipment; and caused to determine whether a sidelink control information for a transmission of the first user equipment using the allocated resources is to be transmitted on a control channel.

BRIEF DESCRIPTION OF THE DRAWINGS

For proper understanding of example embodiments, reference should be made to the accompanying drawings, wherein.

DETAILED DESCRIPTION

Figure 1:
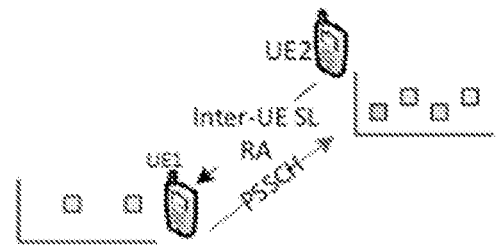
FIG. 1 illustrates an example of a solution on sidelink transmission.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for sidelink (SL) transmission for SL inter-user equipment (UE) resource allocation (RA).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

Certain example embodiments may relate to new radio (NR) SL enhancements in $3^{rd}$ Generation Partnership Project (3GPP). 3GPP describes NR V2X to support advanced V2X services. According to 3GPP, the NR SL may be enhanced to support wider use cases including, for example, public safety, entertainment, and other commercial applications in which power saving as well as enhanced reliability and reduced latency are considered as the key requirements for those use cases. Further, 3GPP describes certain SL resource allocation enhancements that have been identified as one of various objectives. For instance, there has been interest in inter-user equipment (UE) coordination on SL resource allocation for enhanced reliability and reduced latency.

As described in 3GPP, a set of resources may be determined at UE-A. This set of resources may be sent to UE-B so that UE-B may take the set of resources sent from UE-A into account in a SL resource allocation mode such as mode 2 for its own SL transmission. In NR SL as well as LTE SL design specified in 3GPP, there are two resource allocation modes including, for example SL RA mode 1 and SL RA mode 2. In SL RA mode 1, the scheduled SL transmission resource is allocated by next generation-radio access network (NG-RAN). In SL RA mode 2, the UE autonomously selects SL transmission resources from a pool of resources. Moreover, in mode 2, the UE may in certain cases need to perform a sensing procedure where the UE receives the resource reservation information of other nearby UEs from their transmitted SL control information (SCIs). Afterwards, the UE may select the resource(s) based on the outcome of the sensing procedure.

The SCI described herein may provide an indication of the resource and other transmission parameters used by a SL Tx UE for transmitting a transport block (TB) of SL data, and other control information such as channel state information (CSI) report. The SCI may include two parts such as a $1^{st}$ stage SCI on physical SL control channel (PSCCH), and a $2^{nd}$ stage SCI on physical SL shared channel (PSSCH). Specifically, the $1^{st}$ stage SCI on PSCCH may carry the RA and modulation and coding scheme (MCS) related information. In addition, the $2^{nd}$ stage SCI on PSSCH may carry the hybrid automatic repeat request (HARQ) and SL IDs related information.

In certain cases, channel busy ratio (CBR) based congestion control is also introduced in LTE and NR SL. In particular, SL CBR may be defined as the portion of sub-channels in the resource pool of which SL received signal strength indicator (RSSI) measured by the UE exceeds a (pre-)configured threshold sensed over CBR measurement window. Further, SL RSSI may be defined as the linear average of total received power observed in the configured sub-channel in OFDM symbols of a slot configured for PSCCH and PSSCH.

Though inter-UE RA between device-to-device (D2D) or SL UE pairs or among D2D cluster is a generally known concept, support of SL inter-UE RA is rather open in 3GPP. There are several issues related to SL inter-UE RA to be solved including, for example, determining how to identify the need of SL resource of one UE's SL transmission by the peer UE. Another issue may include what the signaling mechanisms are for SL resource request and RA among SL peer UEs. A further issue may include determining how to organize the PSCCH and PSSCH transmission in case of inter-UE SL RA. As such, certain example embodiments, may provide solutions as to an improved way of transmitting PSCCH and PSSCH of a first UE (UE1) that receives inter-UE SL RA from a second UE (UE2) without causing an impact on SL transmission or reception as well as sensing based resource allocation of other UEs. According to certain example embodiments, this means that the current format of PSCCH and PSSCH may be used by UE1 and UE2 so that they can be received and sensed by other UEs in a back-forward compatible way.

Considering PSCCH and PSSCH transmission for inter-UE SL RA, solution 1 and solution 2 may be provided. For instance, FIG. 1 illustrates an example of solution 1 on SL transmission. In particular, FIG. 1 illustrates solution 1 on SL transmission in case UE2 allocates SL resource(s) to UE1 for UE1 to transmit SL to UE2. In solution 1, a $1^{st}$ stage SCI may not need to be transmitted via PSCCH if it is UE2 that allocates the SL transmission resources to UE for PSSCH transmission from UE1 to UE2, as illustrated in FIG. 1. In this case, UE2 knows the SL resources as well as the transmission format (e.g. modulation and coding scheme) of SL data transmission over PSSCH from UE1 even without $1^{st}$ stage SCI transmission from UE1 to UE2.

Figure 2:
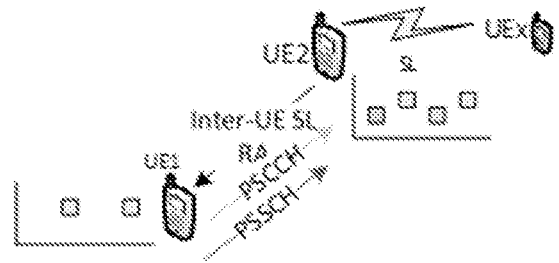
FIG. 2 illustrates an example of another solution on sidelink transmission.

FIG. 2 illustrates an example of solution 2 on SL transmission. In particular, FIG. 2 illustrates solution 2 on SL transmission in case UE2 allocates SL resources to UEL. According to solution 2, the PSCCH transmission of NR SL may be performed by SL Tx UEs that obtain the SL RA from another SL UE using an inter-UE SL RA mechanism, as illustrated in FIG. 2.

In the case of solution 1, omitting PSCCH transmission by UE1 may not impact the reception of UE1's PSSCH transmission by UE2 as the PSSCH transmission from UE1 uses the resources allocated by UE2 so that UE2 knows in which resources to receive PSSCH from UE1. However, this may impact the sensing performed by other proximity SL UEs using mode 2 RA because mode 2 sensing is based on the resource information transmitted over PSCCH. In addition, if the inter-UE SL RA is transmitted from UE2 to UE1 by using a message above the physical layer (e.g., by using PC5-radio resource control (RRC) or SL medium access control (MAC) CE), the inter-UE SL RA message may only be received by UE1, but not detectable for a third UE. As such, this may prevent the third UE from sensing the corresponding resource reservation information. Moreover, even if the inter-UE SL RA is performed by using a physical layer message, it may be only a single attempt transmission and, thus, may have impact on the efficiency of mode 2 sensing as well as the reservation of SL resources compared to using PSCCH based sensing mechanism. In addition, even if inter-UE SL RA is using mode 1 resources, PSCCH information may also be needed for sensing if mode 1 and mode 2 RA methods share the same resource pool.

In case of solution 2, although existing PSCCH and PSSCH transmission mechanisms for NR SL can be reused, it may not provide the best sensing performance from UE2's reception point of view as illustrated in FIG. 2. Using FIG. 2 as an example, if it is UE1 to transmit PSCCH and PSSCH as supported in current LTE or NR SL, UEx may not be able to detect PSCCH transmitted by UE1, and therefore UEx may select the same resources that UE2 allocated to UE1 for UE1 to transmit SL to UE2. However, as UEx and UE2 are in proximity, UEx's transmission may interfere with UE2's reception of PSSCH transmission from UE1 even if UEx and UE1 use the partially overlapping resource for their PSSCH transmission. As UE1 SL resource is allocated by UE2, it may be possible to optimize the mode 2 sensing mechanism to avoid the hidden device problem among different SL mode 2 UEs.

In certain cases, variations of SL mode 2 RA may be available. for instance, SL RA mode 2 may encompass the UE autonomously selecting SL resources for transmission. In addition, the UE may assist SL resource selection for other UE(s), and the UE may be configured with NR configured grant (Type-1 like) for SL transmission. Moreover, the UE may schedule SL transmissions of other UEs.

Furthermore, the centralized scheduling wherein a serving or controlling device (BS or UE) allocates resources and schedules transmissions for one or more user devices (UEs) using some control channel (PDCCH from the serving BS or some control channel from the serving UE) may also be available. However, current standards do not support a centralized scheduling of SL transmissions by a serving UE for other UEs over SL. In addition, the current PSCCH may be used by the Tx UE to indicate SL scheduling assignment and/or resource reservation of the Tx UE itself to other UEs in proximity. This may be applied for certain example embodiments described herein, and certain example embodiments may not cause any change to the current PSCCH in term of indicating the SL scheduling assignment of the SL Tx UE.

Figure 3:
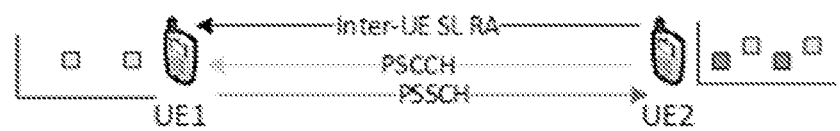
FIG. 3 illustrates a communication diagram between UE1 and UE2, according to certain example embodiments.

FIG. 3 illustrates a communication diagram between UE1 and UE2, according to certain example embodiments. As illustrated in FIG. 3, certain example embodiments may provide a way of PSCCH and PSSCH transmission applied for SL inter-UE RA. For instance, as illustrated in FIG. 3, UE2 may allocate the SL resources to UE1 for UE1's PSSCH transmission. Further, according to certain example embodiments, UE2 that allocates the SL resources may transmit the $1^{st}$ stage SCI over PSCCH on behalf of UE1 that may use the allocated SL resources for its own PSSCH transmission including the $2^{nd}$ stage of SCI. That is, the $1^{st}$ stage of SCI over PSCCH may be transmitted by one SL UE (i.e., UE2 in FIG. 3) while the $2^{nd}$ stage of SCI and SL data over PSSCH may be transmitted by another SL UE (i.e., UE1 in FIG. 3). As such, this procedure of certain example embodiments differs from methods in NR or LTE SL on transmission of PSCCH and PSSCH from the same SL UE as illustrated in FIG. 2. Moreover, the procedure according to certain example embodiments such as that illustrated in FIG. 3 may provide the ability to avoid interference between two UEs in proximity (e.g., Rx UE, UE2, and another UE, UEx), where UEx's transmission may interfere with UE2's reception of PSSCH transmission from UE1 if UEx and UE1 use the same resource for their PSSCH transmission.

According to certain example embodiments, after UE2 allocates SL resources to UE1 via inter-UE SL RA message, UE2 may determine whether the $1^{st}$ stage of SCI for UE1's transmission using UE2 allocated resources should be transmitted by UE2 or UE1, or completely omitted. In certain example embodiments, UE2's determination may be based on whether the allocated SL resources is used by UE1 to transmit PSSCH to UE2 or not, and/or whether it is for SL unicast or SL broadcast/groupcast. If the allocated resource is for UE1 to transmit PSSCH to UE2 using SL unicast, UE2 may transmit $1^{st}$ stage SCI over PSCCH on behalf of UE1. On the other hand, if it is SL broadcast or groupcast, or if it is SL unicast to another SL Rx UE instead of UE2, UE2 may determine not to transmit $1^{st}$ stage SCI for UE1. Instead, UE1 may transmit the $1^{st}$ stage SCI in the conventional way.

In certain example embodiments, if UE2 selects the SL resources (including the resources allocated to UE1) using SL RA mode 2, UE2 may also need to send resource reservation information for the sensing purpose to avoid other SL mode 2 UEs from selecting the same resource. Alternatively, in certain example embodiments, the inter-UE SL RA signaling illustrated in FIG. 3 may use physical layer signaling such as SCI over PSCCH to inform UE1 of the allocated SL resources. According to certain example embodiments, the time interval between UE2 sending the SL resource reservation information or inter-UE SL RA signaling over PSCCH and the corresponding PSCCH transmission time may be shorter than the (pre-)configured threshold. In this case, UE2 may also determine that neither UE1 nor UE2 sends PSCCH if UE2 is the only SL Rx UE of the associated UE1's PSSCH transmission using UE2 allocated SL resources.

According to certain example embodiments, UE2 may obtain the SL resources (including the resource allocated to UE1) using SL resource allocation mode 1 with dedicated resource pool (i.e., not the shared resource pool of mode 1 and mode 2). In this case, UE2 may also determine that neither UE1 nor UE2 sends PSCCH if UE2 is the only SL Rx UE of the associated UE1's PSSCH transmission using UE2 allocated SL resources.

In certain example embodiments, inter-UE RA from UE2 may or may not be the only SL resource allocation method that UE1 is configured. In this scenario, UE2 may determine to transmit $1^{st}$ stage SCI over PSCCH on behalf of UE1 if UE1 only uses UE2 allocated resources for SL transmission. Otherwise, UE2 may determine to leave UE1 to transmit $1^{st}$ stage SCI. For the latter case, UE1 may have multiple allocated SL resources from different SL UEs and/or BS in case mode 1 is also configured for UE1 in addition to inter-UE SL RA. According to certain example embodiments, multiple SL allocations may be overlapping in the time domain so that UE1 cannot make SL transmission(s) with multiple TBs simultaneously. In this case, it may be advantageous to allow UE1 to determine which SL allocation or even the combined SL resources from multiple allocating UEs should be used for SL transmission and, thus, to transmit PSCCH accordingly.

According to certain example embodiments, after UE 2 determines the transmission of PSCCH for associated UE1's PSSCH transmission using UE2 allocated SL resources, UE1 may be informed of the decision using various mechanisms. For instance, in certain example embodiments, the decision may be explicitly indicated in the inter-UE SL RA signaling message transmitted from UE2 to UE1, or in a separate signaling message. In other example embodiments, the decision may be implicitly indicated by UE2 based on the allocated SL resource. For example, if UE2 allocates the PSSCH resources without PSCCH resource to UE1, it may indicate that UE1 does not need to transmit PSCCH for the associated PSSCH transmission using the allocated resources from UE2.

According to other example embodiments, in another mechanism, the decision may also be implicitly derived by UE1 based on the (pre-)configuration related to inter-UE SL RA. For example, UE1 may determine, based on (pre-)configuration, not to transmit PSCCH for associated PSSCH transmission using inter-UE allocated resources if UE1 uses the UE2 allocated resources to transmit SL unicast to UE2. Alternatively, UE1 may determine not to transmit PSCCH if it detects that the time interval between received resource reservation information or inter-UE SL RA signaling using PSCCH and the corresponding PSCCH transmission associated with UE1's PSSCH is shorter than the configured threshold.

In certain example embodiments, in another mechanism, if UE1 is informed or determines not to transmit PSCCH for the associated PSSCH using UE2 allocated resources, UE1 may listen to PSCCH transmission from other SL UEs in proximity to detect possible PSSCH resource collision. If such collision is detected, UE1 may determine whether or not to transmit PSSCH based on, for example, the traffic priority of its own and detected colliding UEs, the quality of service (QoS) requirement (e.g., delay and/or reliability requirement) of SL data traffic, and/or the available SL resources for next SL transmission.

According to certain example embodiments, in a further mechanism, when UE2 sends PSCCH on behalf of UE1, UE2 may also provide an indication in the $1^{st}$ stage SCI to indicate whether PSCCH is transmitted by SL Rx UE (i.e., UE2 in FIG. 3) or SL Tx UE (i.e., UE1 in FIG. 3). Such indication may be used to facilitate sensing and/or CBR measurements of the proximity SL UEs. For example, the proximity SL UEs (i.e. UEx in FIG. 2) may determine to measure CBR based on SL RSSI measured only on PSCCH or PSSCH if it detects the indication that PSCCH and PSSCH are transmitted by different UEs.

Figure 4:
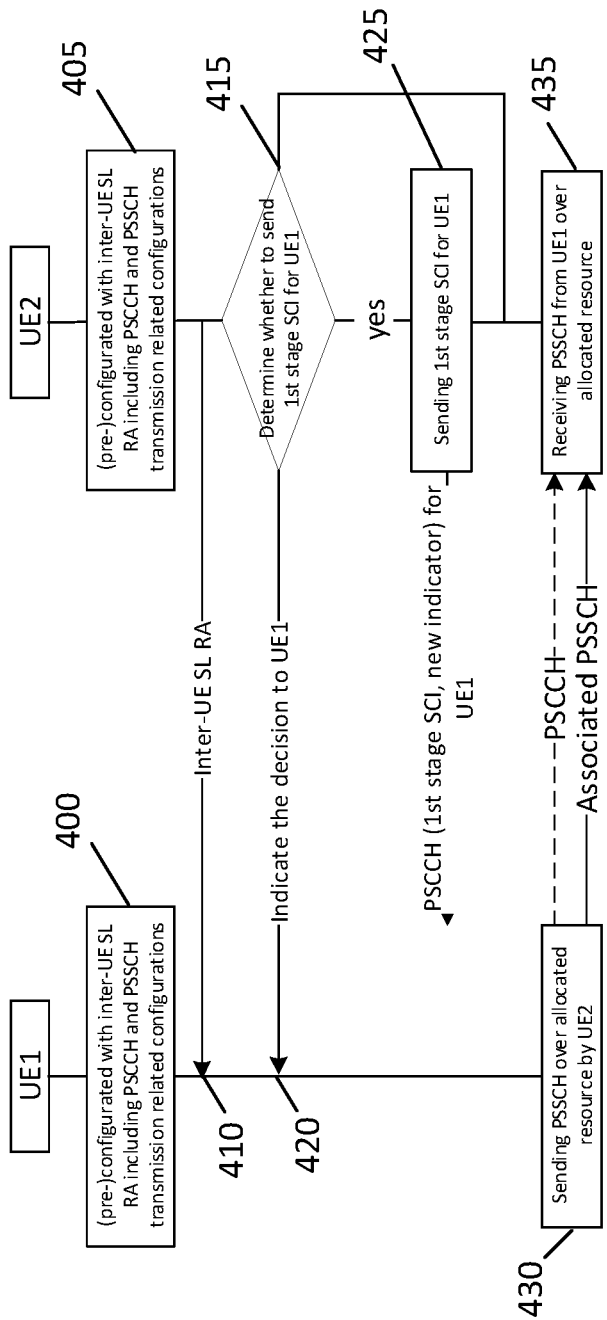
FIG. 4 illustrates an example signal flow, according to certain example embodiments.

FIG. 4 illustrates an example signal flow, according to certain example embodiments. As illustrated in FIG. 4, at 400 and 405, if inter-UE SL RA is supported, the SL UEs (e.g., UE1 and UE2) that support the feature may be configured with inter-UE SL RA related configuration. In certain example embodiments, the inter-UE SL RA related configuration may include the corresponding configuration on transmission of PSCCH and PSSCH. For example, the configuration may include the support of PSCCH and PSSCH transmission from different UEs or not, the conditions/criteria on support of PSCCH and PSSCH transmission by different UEs, and/or the threshold configuration (e.g., the time interval threshold described above).

As illustrated in FIG. 4, at 410, UE2 may transmit the inter-UE SL RA to UE1. Further, at 415, UE2 may determine whether or not to send $1^{st}$ stage SCI for UE. According to certain example embodiments, UE1 may facilitate this determination by indicating the corresponding information that UE2 needs to make the decision. For example, the needed information may include the destination L2 ID and/or priority associated with the SL data that triggers the inter-UE SL RA. The needed information may also include whether UE1 has SL unicast, groupcast, or broadcast data in the buffer if destination L2 ID cannot indicate the cast type. Furthermore, the needed information may include whether UE1 has other SL RA mode (e.g., mode 1 or inter-UE RA from other UEs) configured. According to certain example embodiments, such information may be provided from UE1 to UE2 using inter-UE signaling similar to the scheduling request (SR), buffer status report (BSR), and/or UE-assistant information (UAI) defined for Uu.

As illustrated in FIG. 4, at 420, UE2's decision may be indicated to UE1. According to certain example embodiments, the inter-UE SL RA signaling and the indication signaling of UE2's decision on transmission of PSCCH may be separate signaling messages, as illustrated in FIG. 4. However, in other example embodiments, the inter-UE SL RA signaling and the indication signaling may be combined into the same message using either physical layer signaling, MAC control element (CE), or RRC signaling message. In certain example embodiments, along with the inter-UE SL RA signaling, UE1 may be indicated to allow to transmit only to UE2 using resources allocated by UE2. In other example embodiments, UE1 may be allowed to transmit to any targeted Rx UE or predefined group of Rx UEs using resources allocated by UE2.

If at 415 UE2 determines to send the $1^{st}$ stage SCI for UE1, at 425, UE2 may send the $1^{st}$ stage SCI for UE1 on PSCCH so that the SL UEs in proximity of UE2 can use the transmitted SCI for sensing based SL mode 2 resource allocation or other purpose. As previously noted, by sending PSCCH on behalf of UE1, UE2 may also provide an indicator in the $1^{st}$ stage SCI to indicate whether PSCCH is transmitted by SL Rx UE (i.e., UE2) or SL Tx UE (i.e., UE1). Further, at 430, UE1 may transmit PSSCH to UE2 over the allocated resource by UE2 and, at 435, UE2 may receive the PSSCH from UE1 over the allocated resource.

According to certain example embodiments, UE1 may determine whether to transmit PSSCH or not using UE2 allocated resources based on, for example, detected PSSCH resource collision or priority of the SL data corresponding to multiple allocated SL resources. In certain example embodiments, if UE1 determines not to transmit PSSCH, this may trigger UE2 to perform a new inter-UE SL RA. In addition, according to other example embodiments, the new inter-UE SL RA may be triggered in UE2 by detecting one or multiple missing PSSCH transmissions from UE1 in the allocated resources by UE2. Alternatively, this may be based on an explicit indication received from UE1.

Figure 5:
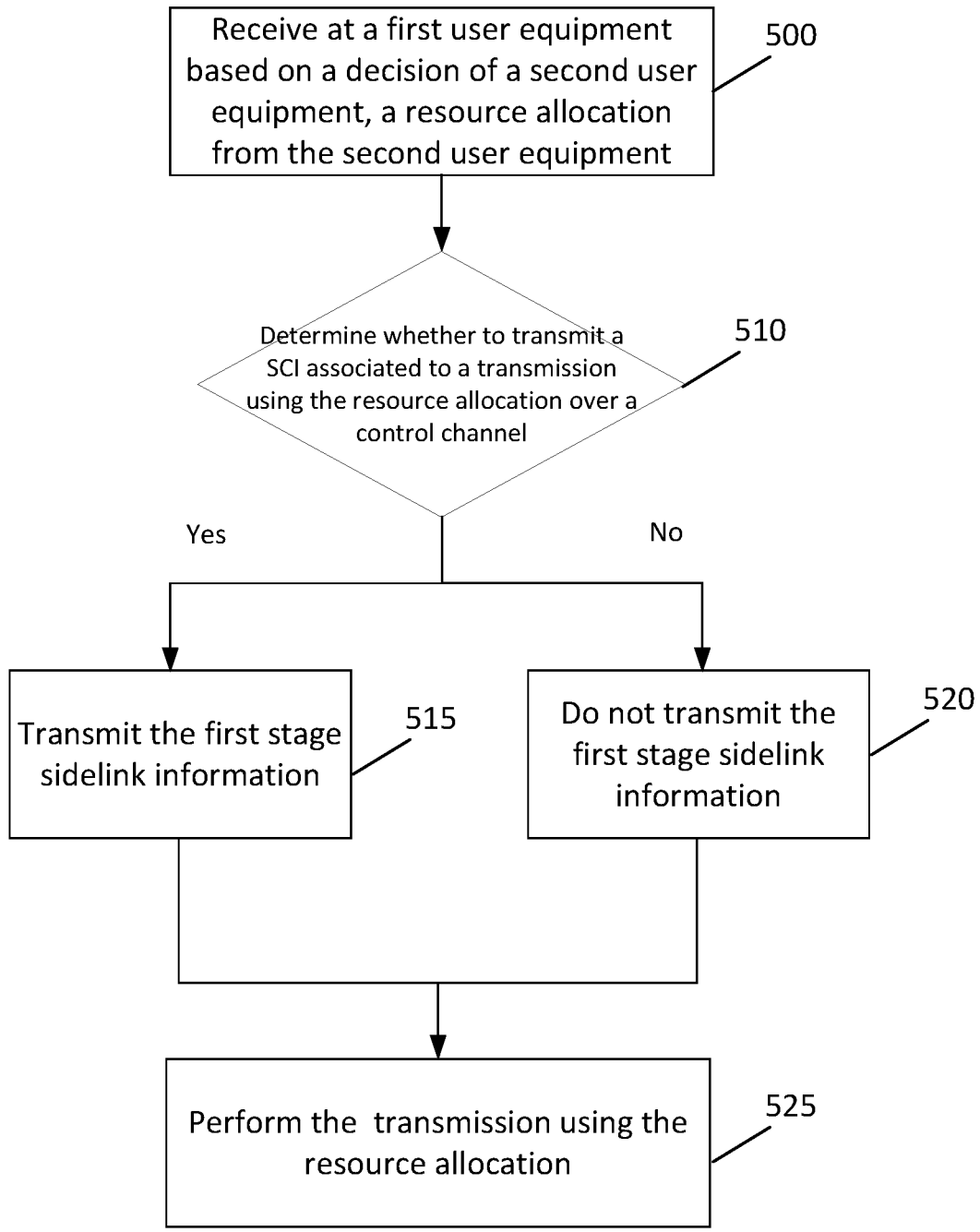
FIG. 5 illustrates a flow diagram of a method, according to certain example embodiments.

FIG. 5 illustrates a flow diagram of a method, according to certain example embodiments. In certain example embodiments, the flow diagram of FIG. 5 may be performed by a telecommunications network, network entity or network node in a 3GPP system, such as LTE or 5G-NR. For instance, in an example embodiment, the method of FIG. 5 may be performed by a UE, for instance similar to apparatuses 10 or 20 illustrated in FIGS. 7(a) and 7(b).

According to certain example embodiments, the method of FIG. 5 may include, at 500, receiving at a first user equipment based on a decision of a second user equipment, a resource allocation from the second user equipment. The method may also include, at 505, determining whether to transmit a sidelink control information associated to a transmission using the resource allocation over a control channel. If the determination at 510 is yes, then the method may include, at 515, transmitting the first stage sidelink control information over the control channel. On the other hand, if the determination at 510 is no, then the method may include, at 520, not transmitting the first stage sidelink information. The method may further include, at 525, performing the transmission using the resource allocation.

According to certain example embodiments, the resource allocation may be received via an inter-user equipment sidelink resource allocation (inter-UE SL RA) message. According to other example embodiments, the control channel may be a physical sidelink control channel (PSCCH). In certain example embodiments, the transmission may be a second channel transmission including at least one of a second stage sidelink control information or sidelink data. In certain example embodiments, the transmission may be transmitted to the second user equipment. In certain example embodiments, the transmission may be transmitted to a third user equipment. In some example embodiments, the method may further include transmitting information to the second user equipment to facilitate the second user equipment in making the decision. According to certain example embodiments, the information may include at least one of a destination layer-2 identifier or a priority associated with sidelink data that triggers the resource allocation, an indication of whether the first user equipment has sidelink unicast, groupcast, or broadcast data, or an indication of whether the first user equipment has other sidelink resource allocation modes configured.

In certain example embodiments, the information may be transmitted via inter-user equipment signaling. In other example embodiments, the method may further include receiving a notification at the first user equipment of the decision, and the determining may be based on the received notification at the first user equipment. In some example embodiments, the notification may be received via one of an explicit indication in an inter-user equipment sidelink resource allocation signaling message from the second user equipment or a separate signaling message, an implicit indication by the second user equipment based on the allocated resource, or an implicit indication derived by the first user equipment based on a (pre-)configuration related to the inter-user equipment sidelink resource allocation.

According to certain example embodiments, when the first user equipment is informed or determines not to transmit the sidelink control information over the control channel for an associated second channel using the resource allocation, the method may also include listening to the sidelink control information from other sidelink user equipment in proximity to detect possible second channel resource collision. According to other example embodiments, the sidelink control information transmitted over the control channel may include an indication indicating whether the sidelink control is transmitted by the same or different user equipment that transmits the associated second channel transmission. According to further example embodiments, the method may include determining whether to transmit second channel transmission or not using the resource allocation based on detected second channel resource collision or a priority of sidelink data transmitted on the second channel using the allocated sidelink resource.

Figure 6:
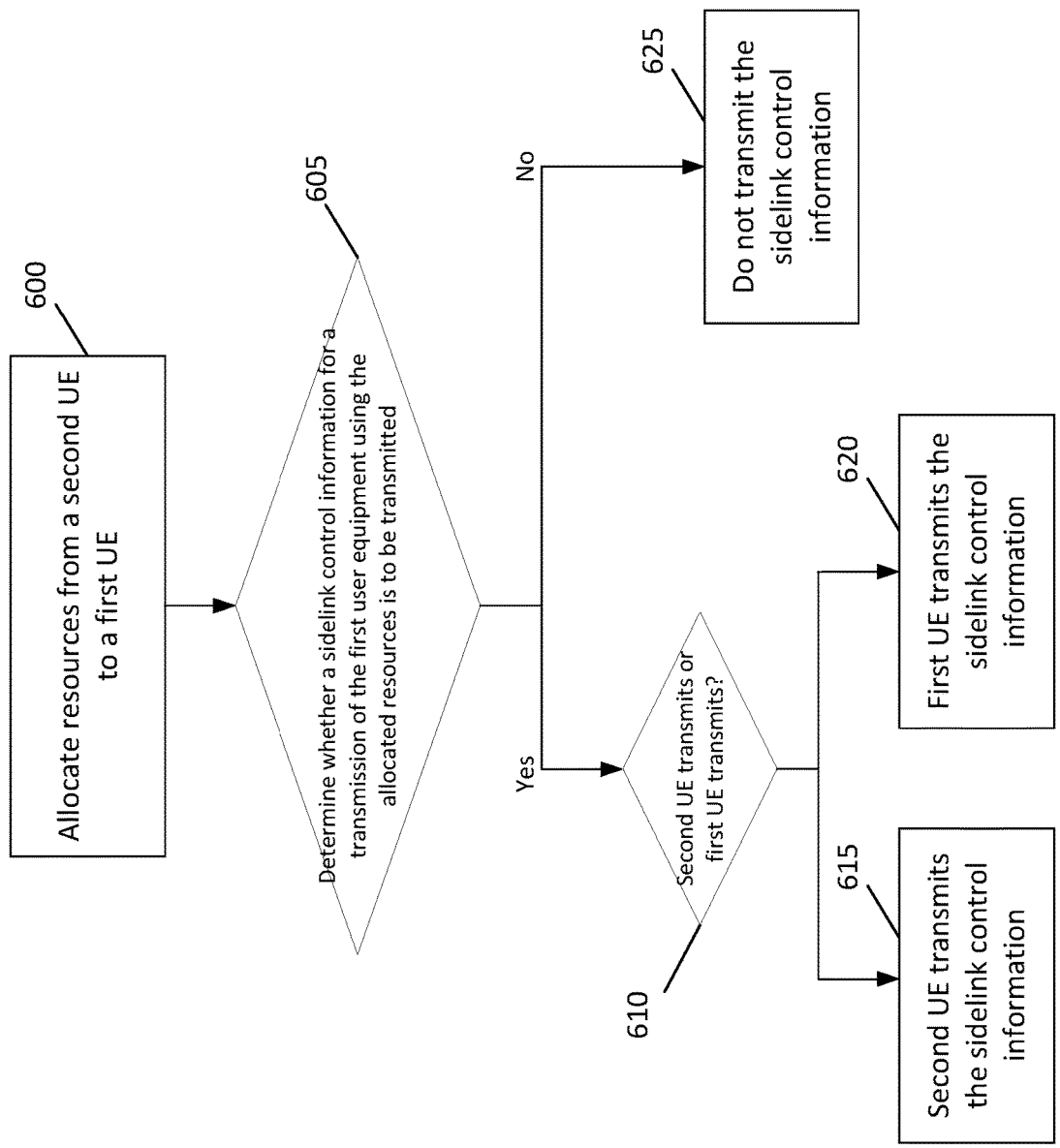
FIG. 6 illustrates a flow diagram of another method, according to certain example embodiments.

FIG. 6 illustrates a flow diagram of another method, according to certain example embodiments. In certain example embodiments, the flow diagram of FIG. 6 may be performed by a telecommunications network, network entity or network node in a 3GPP system, such as LTE or 5G-NR. For instance, in an example embodiment, the method of FIG. 6 may be performed by a UE, for instance similar to apparatuses 10 or 20 illustrated in FIGS. 7(a) and 7(b).

According to certain example embodiments, the method of FIG. 6 may include, at 600, allocating resources from a second user equipment to a first user equipment. The method may also include, at 605, determining whether a sidelink control information for a transmission of the first user equipment using the allocated resources is to be transmitted. According to certain example embodiments, the determining may include determining that the second user equipment transmits the sidelink control information on a control channel. Alternatively, the determining may include determining that the first user equipment transmits the sidelink control information on the control channel, or that the transmission of the sidelink control information is to be omitted. If the determination at 605 is yes, the method may include, at 610, determining whether the second user equipment or the first user equipment transmits the sidelink control information. If at 610, it is determined that the second user equipment transmits, then, at 615, the second user equipment transmits the sidelink control information over the control channel on behalf of the first user equipment. On the other hand, if at 610, it is determined that the first user equipment transmits, then, at 620, the first user equipment transmits the first sidelink control information over the control channel. Further, if the determination at 605 is no, the method may include, at 625, not transmitting the sidelink control information over the control channel.

According to certain example embodiments, the method may further include receiving the transmission from the first user equipment using the allocated resources. According to further example embodiments, the resources may be allocated via an inter-user equipment sidelink resource allocation (inter-UE SL RA) message. In certain example embodiments, the sidelink control information is a first stage sidelink control information, and the control channel may be a physical sidelink control channel (PSCCH). According to other example embodiment, the transmission may be a second channel transmission including a second stage sidelink control information and sidelink data.

In certain example embodiments, the determining may be based on at least one of a destination layer-2 identifier or a priority associated with sidelink data that triggers the resource allocation, an indication of whether the first user equipment has sidelink unicast, groupcast, or broadcast data, or an indication of whether the first user equipment has other sidelink resource allocation modes configured. In some example embodiments, the method may further include sending a notification to the first user equipment informing the first user equipment of the determination via one of an explicit indication in an inter-user equipment sidelink resource allocation signaling message from the second user equipment or a separate signaling message, or an implicit indication derived by the first user equipment based on a pre-configuration related to the inter-user equipment sidelink resource allocation.

According to certain example embodiments, the sidelink control information over the control channel may include an indication indicating whether the sidelink control information transmitted over the control channel is transmitted by the same or different user equipment that transmits the associated second channel transmission. According to other example embodiments, the determining may further include determining that transmission of the sidelink control information is to be omitted. Further, in certain example embodiments, the method may include determining that the first user equipment transmits the sidelink control information on the control channel. According to further example embodiments, the method may include obtaining the resources using a first sidelink resource allocation mode or a second sidelink resource allocation mode.

Figure 7A:
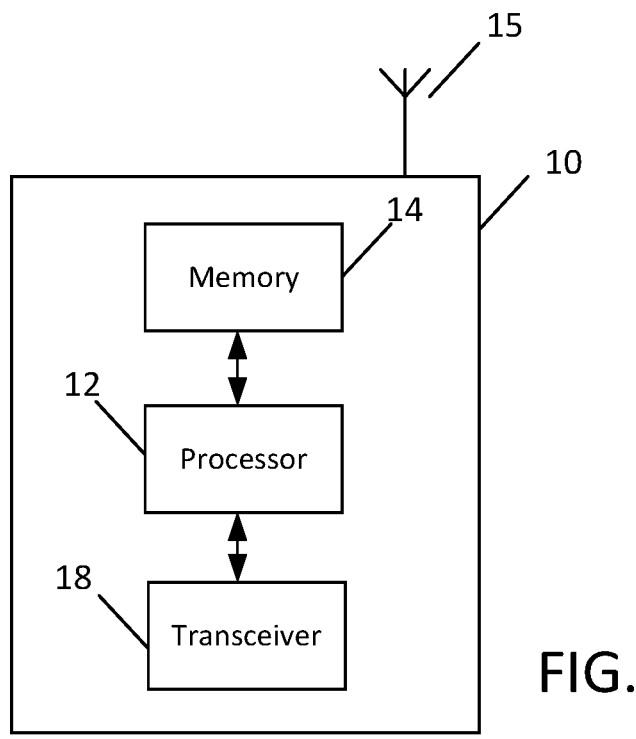
FIG. 7(a) illustrates an apparatus, according to certain example embodiments.

FIG. 7(a) illustrates an apparatus 10 according to certain example embodiments. In certain example embodiments, apparatus 10 may be a node or element in a communications network or associated with such a network, such as a UE, mobile equipment (ME), mobile station, mobile device, stationary device, IoT device, or other device. In other example embodiments, apparatus 10 may be a network element, node, host, server in a communication network or serving such a network. It should be noted that one of ordinary skill in the art would understand that apparatus 10 may include components or features not shown in FIG. 7(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 7(a).

As illustrated in the example of FIG. 7(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-6.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to receive, based on a decision of a second user equipment, a resource allocation from the second user equipment. Apparatus 10 may also be controlled by memory 14 and processor 12 to determine whether to transmit a sidelink control information associated to a transmission using the resource allocation over a control channel. Apparatus 10 may further be controlled by memory 14 and processor 12 to perform a transmission using the resource allocation.

Figure 7B:
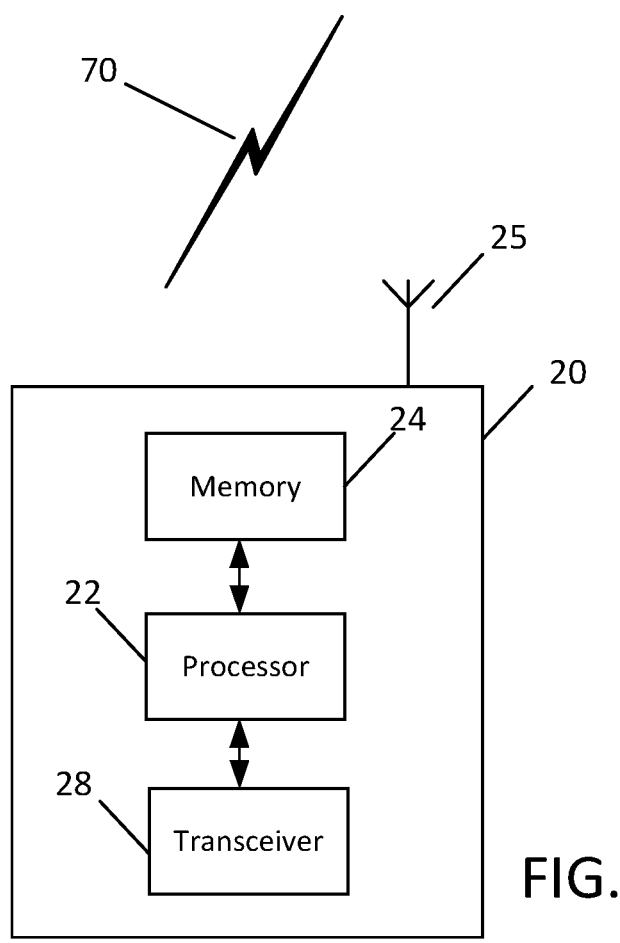
FIG. 7(b) illustrates another apparatus, according to certain example embodiments.

FIG. 7(b) illustrates an apparatus 20 according to certain example embodiments. In certain example embodiments, the apparatus 20 may be a node or element in a communications network or associated with such a network, such as a UE, mobile equipment (ME), mobile station, mobile device, stationary device, IoT device, or other device. In other example embodiments, apparatus 10 may be a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 7(b)

As illustrated in the example of FIG. 7(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

As discussed above, according to certain example embodiments, apparatus 20 may be a UE, for example. According to certain embodiments, apparatus 20 may be controlled by memory 14 and processor 12 to perform the functions associated with example embodiments described herein. For instance, in certain example embodiments, apparatus 20 may be controlled by memory 24 and processor 22 to allocate resources from to a first user equipment. Apparatus 20 may also be controlled by memory 24 and processor 22 to determine whether a sidelink control information for a transmission of the first user equipment using the allocated resources is to be transmitted. In certain example embodiments, the determining may include determining that the apparatus transmits the sidelink control information on a control channel. In other example embodiments, the determining may include determining that the first user equipment transmits the sidelink control information on the control channel, or that the transmission of the sidelink control information is to be omitted.

Further example embodiments may provide means for performing any of the functions, steps, or procedures described herein. For example, certain example embodiments may be directed to an apparatus that includes means for receiving, based on a decision of a second user equipment, a resource allocation from the second user equipment. The apparatus may also include means for determining whether to transmit a sidelink control information associated to a transmission using the resource allocation over a control channel. The apparatus may further include means for performing a transmission using the resource allocation.

Other example embodiments may be directed to a further apparatus that includes means for allocating resources to a first user equipment. The apparatus may also include means for determining whether a sidelink control information for a transmission of the first user equipment using the allocated resources is to be transmitted. According to certain example embodiments, the determining may include determining that the apparatus transmits the sidelink control information on a control channel. In certain example embodiments, the determining may include determining that the first user equipment transmits the sidelink control information on the control channel, or that the transmission of the sidelink control information is to be omitted.

Certain example embodiments described herein provide several technical improvements, enhancements, and/or advantages. In some example embodiments, it may be possible to avoid interference between two UEs in proximity (Rx UE, UE2, and another UE, UEx), where UEx's transmission may interfere with UE2's reception of PSSCH transmission from UE1 if UEx and UE1 use the same resource for their PSSCH transmission. For example, certain example embodiments may provide a way of transmitting PSCCH and PSSCH of a first UE (UE1) that receives inter-UE SL RA from a second UE (UE2) without causing an impact on SL transmissions and reception of other UEs. In other example embodiments, it may be possible to transmit the $1^{st}$ stage SCI over PSCCH by the Rx UE (UE2), while the $2^{nd}$ stage SCI and SL data over PSSCH is transmitted by a different UE, Tx UE (UE1) to improve sidelink mode 2 resource allocation performance. In other example embodiments, it may be possible to omit the $1^{st}$ stage SCI over PSCCH for the transmission of SL data over PSSCH using the inter-UE SL RA to improve the power consumption of SL UEs without impact on the performance of sidelink mode 2 resource allocation.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

CBR Channel Busy Ratio
eNB Enhanced Node B
gNB 5G or Next Generation NodeB
LTE Long Term Evolution
NR New Radio
PCF Policy Control Function
PSCCH Physical SL Control Channel
PSSCH Physical SL Shared Channel
RA Resource Allocation
SCI SL Control Information
SL Sidelink
UE User Equipment

We claim:
1. A method, comprising:
receiving at a first user equipment based on a decision of a second user equipment, a resource allocation from the second user equipment;
receiving, at the first user equipment from the second user equipment, a notification of a determination of whether to transmit, from the second user equipment, a sidelink control information associated to a transmission using the resource allocation over a control channel; and
receiving, at the first user equipment, the transmission of the sidelink control information over the control channel using the resource allocation,
wherein the transmission of the sidelink control information comprises an indicator which indicates whether the control channel is transmitted by the second user equipment or by the first user equipment, and which triggers the first user equipment or the second user equipment to measure a channel busy ratio of other user equipment in proximity to the first user equipment or the second user equipment.

2. An apparatus, comprising:
at least one processor; and
at least one memory comprising computer program code,
the at least one memory and computer program code are configured, with the at least one processor, to cause the apparatus at least to:

receive, based on a decision of a user equipment, a resource allocation from the user equipment;

receive from the user equipment, a notification of a determination of whether to transmit, from the user equipment, a sidelink control information associated to a transmission using the resource allocation over a control channel; and receive the transmission of the sidelink control information over the control channel using the resource allocation, wherein the transmission of the sidelink control information comprises an indicator which indicates whether the control channel is transmitted by the user equipment or by the apparatus, and which triggers the user equipment or the apparatus to measure a channel busy ratio of other user equipment in proximity to the user equipment or the apparatus.

3. The apparatus according to claim 2, wherein the resource allocation is received via an inter-user equipment sidelink resource allocation message.

4. The apparatus according to claim 2, wherein the sidelink control information is a first stage sidelink control information and the control channel is a physical sidelink control channel.

5. The apparatus according to claim 2, wherein the transmission is a second channel transmission comprising at least one of a second stage sidelink control information or sidelink data.

6. The apparatus according to claim 2, wherein the at least one memory and computer program code are configured, with the at least one processor, to further cause the apparatus at least to:

transmit information to the user equipment to facilitate the user equipment in making the decision, wherein the information comprises at least one of:

a destination layer-2 identifier or a priority associated with sidelink data that triggers the resource allocation, an indication of whether the apparatus has sidelink unicast, groupcast, or broadcast data that triggers the resource allocation, or an indication of whether the apparatus has other sidelink resource allocation modes configured.

7. The apparatus according to claim 2, wherein the notification is received via one of:

an explicit indication in an inter-user equipment sidelink resource allocation signaling message from the user equipment or a separate signaling message, an implicit indication by the user equipment based on the allocated resource, or an implicit indication derived by the apparatus based on a pre-configuration related to the inter-user equipment sidelink resource allocation.

8. An apparatus, comprising:

at least one processor; and at least one memory comprising computer program code, the at least one memory and computer program code are configured, with the at least one processor, to cause the apparatus at least to:

receive, based on a decision of a user equipment, a resource allocation from the user equipment;

receive from the user equipment, a notification of a determination of whether to transmit, from the user equipment, a sidelink control information associated to a transmission using the resource allocation over a control channel; and receive the transmission of the sidelink control information over the control channel using the resource allocation, wherein when the apparatus is informed or determines not to transmit the sidelink control information over the control channel for an associated second channel using the resource allocation, the apparatus is further caused to listen to the sidelink control information from other sidelink user equipment in proximity to detect possible second channel resource collision.

9. The apparatus according to claim 2, wherein the sidelink control information transmitted over the control channel comprises an indication indicating whether the sidelink control information is transmitted by the same or different user equipment that transmits the associated second channel transmission.

10. An apparatus, comprising:

at least one processor; and at least one memory comprising computer program code, the at least one memory and computer program code are configured, with the at least one processor, to cause the apparatus at least to allocate resources to a user equipment;

determine whether a first sidelink control information for a transmission of the user equipment using the allocated resources is to be transmitted on a first control channel; and transmit, to the user equipment, the first sidelink control information over the control channel using the allocated resources; and receive, from the user equipment, the transmission using the allocated resources on a second control channel, wherein the transmission of the first sidelink control information comprises an indicator which indicates whether the first control channel is transmitted by the apparatus or by the user equipment, and which triggers the apparatus or the user equipment to measure a channel busy ratio of other user equipment in proximity to the apparatus or the user equipment.

11. The apparatus, according to claim 10, wherein the determination comprises the apparatus being further caused to:

determine that the apparatus transmits the first sidelink control information on the first control channel, or determine that the user equipment transmits a second sidelink control information on the second control channel, or that the transmission of the first sidelink control information is to be omitted.

12. The apparatus according to claim 10, wherein after determining that the apparatus transmits the first sidelink control information, the apparatus is further caused to transmit the first sidelink control information over the first control channel.

13. The apparatus according to claim 10, wherein the resources are allocated via an inter-user equipment sidelink resource allocation message.

14. The apparatus according to claim 10, wherein the first sidelink control information is a first stage sidelink control information and the first control channel is a physical sidelink control channel.

15. The apparatus according to claim 10, wherein the transmission is a second channel transmission comprising at least one of a second stage sidelink control information or sidelink data.

16. The apparatus according to claim 15, wherein the first sidelink control information over the first control channel comprises an indication indicating whether the first sidelink control information transmitted over the first control channel is transmitted by the same or different user equipment that transmits the associated second channel transmission.

17. The apparatus according to claim 10, wherein the determining is based on at least one of:
   a destination layer-2 identifier and/or a priority associated with sidelink data that triggers the resource allocation,
   an indication of whether the user equipment comprises sidelink unicast, groupcast, or broadcast data, or
   an indication of whether the user equipment comprises other sidelink resource allocation modes configured.

18. The apparatus according to claim 10, the at least one memory and computer program code are configured, with the at least one processor, to further cause the apparatus at least to:
   send a notification to the user equipment informing the user equipment of the determination via one of:
      an explicit indication in an inter-user equipment sidelink resource allocation signaling message from the apparatus or a separate signaling message,
      an implicit indication by the apparatus based on the allocated resource, or
      an implicit indication derived by the user equipment based on a pre-configuration related to the inter-user equipment sidelink resource allocation.

19. The apparatus according to claim 10, the at least one memory and computer program code are configured, with the at least one processor, to further cause the apparatus at least to:
   allocate the resources using a first sidelink resource allocation mode or a second sidelink resource allocation mode.

* * * * *